July 26, 1932. S. L. INGERSOLL 1,868,749
PROCESS OF MAKING LAMINATED METAL
Filed Dec. 21, 1931
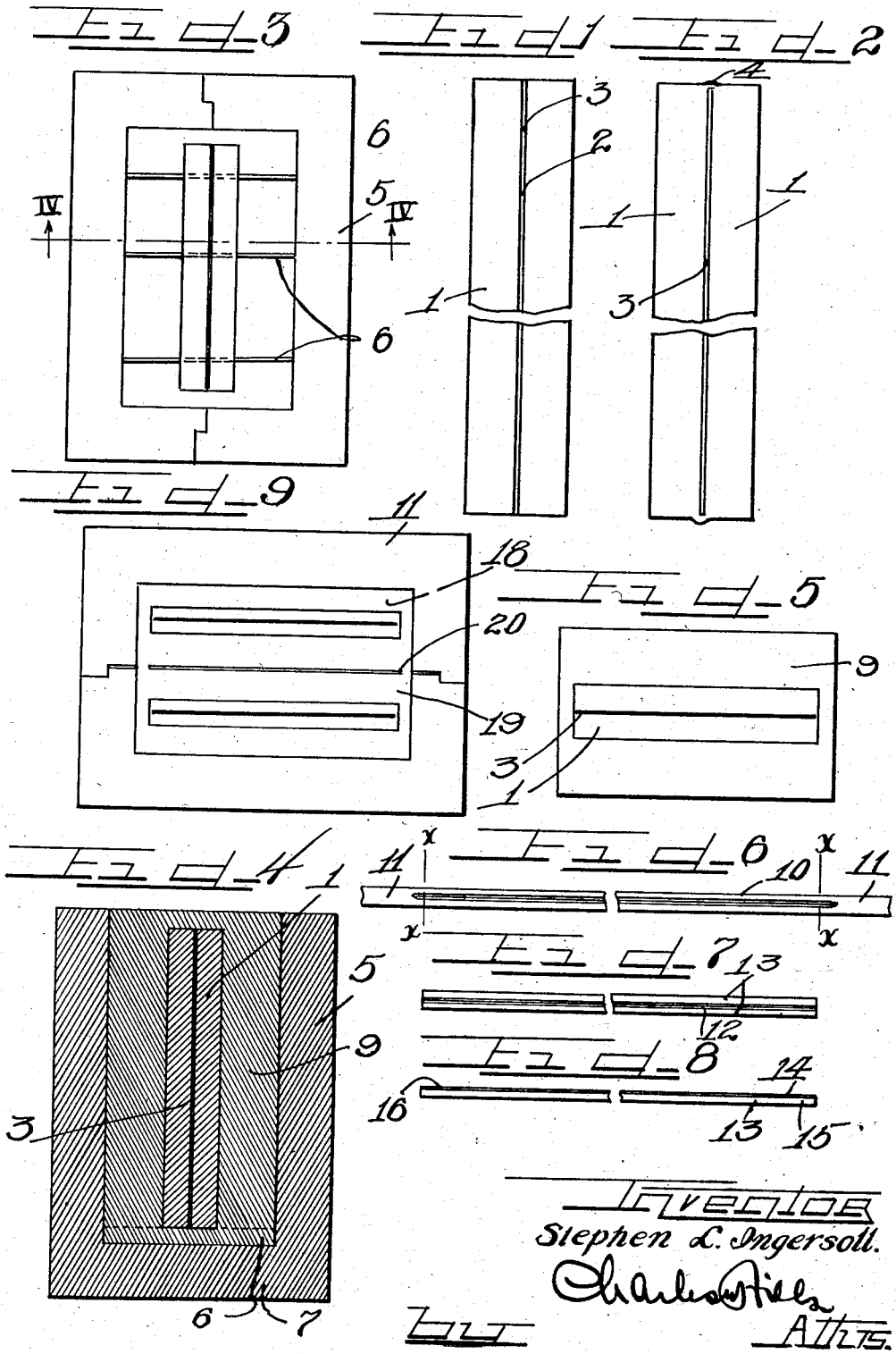

Patented July 26, 1932

1,868,749

UNITED STATES PATENT OFFICE

STEPHEN L. INGERSOLL, OF CHICAGO, ILLINOIS, ASSIGNOR TO INGERSOLL STEEL & DISC CO., OF CHICAGO, ILLINOIS, A CORPORATION OF ILLINOIS

PROCESS OF MAKING LAMINATED METAL

Application filed December 21, 1931. Serial No. 582,375.

This invention relates to a method of making composite metal articles and particularly to a method of making laminated steel sheets, strips, bars or slabs.

In the methods previously in use, in forming composite metal articles or slabs, it has been customary to unite dissimilar metals by various welding processes. Such methods have not been entirely satisfactory because numerous precautions must be taken in endeavoring to obtain a satisfactory bond between the metals. Also when one of the metal surfaces in a finished product is to be polished, the temperature to which the metal must be heated in effecting the weld, particularly in the atmosphere of the furnace, has a marked effect on the surface of the metal, causing pitting, scaling and other defects that require a considerable amount of polishing and/or grinding to eliminate.

It has also been customary to form composite metal articles by casting and rolling but such processes as heretofore practiced have had the disadvantage that no protection for the surfaces to be polished or to be exposed in use is provided during the forming of the article.

According to this invention, two metals, slabs or the like, each of which may have a polished, smoothed, cleaned, or otherwise prepared surface are placed together with such prepared surfaces in juxtaposed relation but separated by a medium that prevents permanent or substantial welding of the said surfaces in the subsequent operations. The adjacent edges surrounding the common surfaces of the composite slab are then welded and the composite slab is next placed in a mold and another metal poured around it. After removal from the mold, the ingot is subjected to a hot rolling operation which completely welds the cast metal to the metal slabs but does not weld the prepared surfaces together due to the presence of the separating medium. The rolling operation naturally enlarges the area of the prepared surfaces. The rolled form is then separated along the prepared surfaces to form two composite sheets each of which presents a smooth surface. By this method the disadvantages attending previously used processes are entirely overcome.

It is therefore an object of this invention to provide an expedient method of forming composite metal sheets wherein protection is given to initially cleaned, smoothed and/or polished surfaces on the slabs from which the sheets are to be formed.

It is also an object of this invention to provide a method of obtaining smooth, even metallic surfaces of considerable area by a method having numerous economical advantages.

It is a particular object of this invention to provide a method of making composite metal sheets by forming composite slabs in multiple, rolling the composite slabs to a multiple of the final thickness desired and separating the rolled form into individual composite sheets each of the desired thickness.

It is also a particular object of this invention to provide a method of coating and rolling composite slabs to obtain a composite metal sheet having large, smooth, even and scale free surfaces without the necessity of a large number of rolling operations.

It is a still further particular object of this invention to provide a method for protecting a prepared surface during forging or rolling operations on the metal.

These and other objects of this invention will be apparent from the following description and appended claims.

This invention (in a preferred form) is illustrated in the accompanying drawing and hereinafter more fully described.

On the drawing:

Figure 1 is a plan view of two juxtaposed slabs of metal having a separating composition between them.

Figure 2 is a view similar to Figure 1 showing the adjacent edges of the metal slabs welded.

Figure 3 is a plan view of a mold used to carry out my invention.

Figure 4 is a sectional view of the mold of Figure 3 taken approximately on the line IV—IV of Figure 3 after pouring.

Figure 5 is a plan view of a composite metal ingot removed from the mold.

Figure 6 shows a form rolled from the ingot of Figure 5.

Figure 7 shows the rolled form of Figure 6 with its ends removed.

Figure 8 shows a single sheet of composite metal.

Figure 9 illustrates a multiple molding arrangement.

As shown on the drawing:

In carrying out this invention, the general steps are to pickle, polish and cold roll, or otherwise clean and prepare adjacent surfaces of metal slabs. The prepared surfaces are coated with a separating composition and the slabs are pressed into contact along their coated prepared surfaces. The adjacent edges of the metal slabs may be welded so as to prevent damage to the inner or enclosed surfaces. The multi-ply slab thus formed is placed in a mold and a metal, usually of a different character, is poured around the slab and allowed to cool. The ingot thus formed is removed from the mold, usually reheated and hot rolled into convenient sheet form. After this, the margins are clipped off back to the separated surfaces. The sheet tends to break apart along the line of the separating composition to form two sheets of metal, each having its prepared surface unaffected by outside agents during the rolling operation or because of the heat incident thereto.

While the above illustrates the general principles of this invention, my invention is particularly applicable for forming sheets of composite metal particularly where one of the metals is stainless steel such as 18% chromium-8%nickel steel or 16 to 18% chromium, 0% nickel steel, rustless iron, or the like, and for a fuller understanding of this invention the following detailed description of the preferred embodiment of my invention is given.

As shown in Figure 1, two slabs 1 of stainless steel are used. One surface 2 of each is cleaned and prepared, as for instance, by pickling and polishing. The prepared surfaces 2 are then coated with a separating composition 3, which may suitably be composed of red lead and sodium silicate (water glass). The proportions by volume of this mixture preferably are as follows:

200 parts sodium silicate.
    300 parts of red lead.
    50 parts of water.

While this composition has been found to give best results, compositions comprising silicate of soda (water glass) and powdered mica, or borax alone, have also been used with success. In applying the separating composition, the paste formed by mixing the sodium silicate, red lead and water is painted on the polished or prepared surfaces of the metal. The thickness of the separating composition should fully cover the juxtaposed surfaces, leaving no uncoated spaces.

The slabs 1, coated as above, are placed together with their prepared or polished coated surfaces 2 in juxtaposed relation. The adjacent edges of the slab 1 are welded, as shown at 4, to hold the slabs in place and to prevent the liquid metal which is poured around the slabs, or other foreign material, from flowing between such surfaces, or to give protection against atmosphere and furnace gases when the slabs are rolled without casting molten metal around them.

The welded slabs 1 are then placed in a mold 5. The mold 5 may be of any suitable material and is of sufficient size so that the metal to be poured will entirely surround the slabs 1. The mold is provided with a number of bridges 6, preferably made of metal of the same composition as that being poured, which lie across the bottom of the mold and which support the slabs in spaced relation with respect to the bottom 7 of the mold. As will be seen from Figure 4, when the slabs of metal are so placed in the mold, their upper edges are below the upper rim of the mold so that the metal may be allowed to flow over the top of the slab.

The metal which is to be united to the stainless steel, is heated to a molten state and poured into the mold about the slab. The metal used is preferably mild steel, 10-point carbon steel having been found to give very advantageous results.

After the metal has cooled, the composite ingot 9 is removed from the mold and again heated to a welding temperature. The composite ingot 9 is hot passed one or more times through rolls to spread it out into the composite sheet illustrated at 10 in Figure 6.

After this, the marginal edges 11 are clipped off along the line X—X of Figure 6. The metal at this stage of the process is illustrated as the multi-ply sheet 12 of Figure 7. However, the plies 13 of the sheet 12 may be easily separated, in fact rolling strains may cause them to pop apart after the margins have been sheared so as to form the individual sheet 13 of Figure 8. The sheet 13 is composed of the upper prepared stainless steel surface 14 and the layer of backing metal 15. The separating composition is almost completely dissipated in the rolling process and may be easily cleaned off the surface of the metal. However, frequently it is not even necessary to brush this composition from the metal.

By this process the ingot may be rolled to such an extent that the layer of surfacing metal is reduced to a thin coating similar to that obtained in electroplating processes. The composite metal has its laminations firmly joined together, as complete welding takes place during the subsequent heating and rolling of the metal after the ingot has been formed.

It is one of the important features of this invention that the separating composition prevents pitting and other deteriorating effects from being produced in the prepared surface. Also the surface 2 on the slab 1 is spread out so that the layer 14 in the finished sheet is provided with a surface 16 that is sufficiently smooth for many purposes without subsequent polishing steps. This feature of the invention may thus be utilized to produce a large smooth, cleaned surface from a small smooth and cleaned surface by placing two slabs of the same, or dissimilar metals with their prepared surfaces adjacent, separated only by the separating composition, welding the adjacent edges and then heating and rolling the multi-ply slab to produce the enlarged prepared surface.

Further, if desired, as in rolling high speed steel, metal of the same analysis may be poured around the prepared slabs or the like and the ingot so cast then rolled and separated in accordance with the process herein described.

Figure 9 illustrates a mold 17 having multiple pouring spaces 18 and 19 partially separated by a diaphragm 20. The diaphragm may be two thin sheets of metal coated on their adjacent surfaces with the separating composition. It will be understood that a mold such as shown at 17 need not be limited to two pouring spaces but may be provided with any number of pouring spaces according to the capacity and requirements of the pouring apparatus.

It will be seen that this invention provides a simple, expedient, and economical method of forming composite sheets of metal. It provides an easy, economical method of coating steel with a layer of smooth, prepared stainless steel or other desired alloy or metal. It provides a very expedient method of producing a large, smooth metal surface without the necessity of the costly grinding and polishing operations heretofore in use.

While I have described my invention particularly with respect to the coating of steel with stainless steel, it will be understood that my invention is practicable for forming many other composite metal sheets. The product of this invention can be used for forming any sort of sheet metal ware where it is important to have one or more non-corrodible surface.

The process of this invention is very economical since the large power consumption ordinarily required in rolling thin sheets is to a large extent eliminated, due to the fact that the final rolling in this process is obviously only to a thickness of twice or more the thickness of the final sheet.

If the abutting surfaces of the slabs used are such as do not weld together, the separating coating composition may not be necessary in practicing the process of this invention.

Many changes may be made in the steps and details of carrying out my process, for instance the composite form produced from the ingot may be given any number of cold passes after the first hot pass, and I do not wish to be limited otherwise than is necessary by the prior art and the scope of the appended claims.

I claim as my invention:

1. The method of forming composite metallic sheets each having a smooth surface, which comprises preparing each of two metal slabs with a pickled and smooth surface, coating the prepared surfaces with a separating and non-bonding composition, pressing the slabs into contact with their prepared surfaces in juxtaposed relation and casting a metal entirely about said slabs.

2. The method of forming composite metallic sheets each having a smooth surface, which comprises preparing a surface on each of two metal slabs, coating the prepared surfaces with a separating composition, pressing the slabs into contact with their prepared surfaces in juxtaposed relation, sealing said common prepared surfaces around the boundary thereof, casting a metal entirely about said slabs, and rolling the ingot thus formed.

3. The method of forming composite metallic sheets having smooth surfaces, which comprises preparing a pickled and smooth surface on each of two metal slabs, coating the prepared surfaces with a non-bonding composition, pressing the slabs into contact with their prepared surfaces in juxtaposed relation, casting a metal entirely about said slabs, reheating the ingot thus formed to a forging temperature, rolling the ingot and cutting off the united marginal edges of the rolled article to form separate metallic sheets each with a smooth surface.

4. The method of forming polished composite metallic sheets, which comprises polishing a surface of each of two stainless steel slabs, coating the polished surfaces with a separating composition, pressing the slabs into contact with their polished surfaces in juxtaposed relation, then sealing their marginal edges surrounding their common surfaces hermetically, and pouring a metal entirely about said slabs.

5. The method of forming composite metallic sheets, which comprises pickling and smoothing a surface of each of two stainless steel slabs, coating the prepared surfaces with a separating and non-bonding composition, pressing the slabs into contact with their prepared surfaces in juxtaposed relation, pouring a metal entirely about said slabs, reheating the ingot thus formed to a forging temperature, rolling the ingot and removing the united marginal edges of the rolled article to form separate composite metallic sheets, each having a smooth surface.

6. The method of forming composite metallic sheets, which comprises pickling and smoothing a surface of each of two stainless steel slabs, coating the smoothed surfaces with a separating and non-bonding composition, pressing the slabs into contact with said surfaces in juxtaposed relation, and casting a mild steel entirely about said slabs.

7. The method of forming composite metallic sheets, which comprises preparing a surface of each of two stainless steel slabs, coating the prepared surface with a non-bonding composition, pressing the slabs into contact with their prepared surfaces in juxtaposed relation, sealing the common prepared surfaces at the boundaries thereof, casting a mild steel entirely about said slabs, reheating the ingot thus formed to forging temperature, rolling said ingot and cutting the united marginal edges of the rolled article to permit separation thereof into two composite metallic sheets.

8. The method of forming a composite metallic article, which comprises preparing a surface of each of two metal slabs, coating the prepared surfaces with a composition comprising a composition containing red lead, pressing the slabs into contact with their prepared surfaces in juxtaposed relation, casting a metal entirely about said slabs, reheating the ingot thus formed to a forging temperature, rolling the same, and cutting off the united marginal edges of the rolled sheet to separate into two sheets.

9. The steps in the process of forming a composite metallic article, which comprise coating prepared surfaces of metal slabs with a composition comprising water glass and red lead, and uniting said slabs along their marginal edges with the coated surfaces in juxtaposed sealed relation for protection of said surfaces during subsequent casting and rolling operations.

10. In the manufacture of a composite metallic article by welding and rolling having a polished surface thereon without polishing treatment subsequent to rolling, the method which comprises polishing a surface of a pair of metal slabs, bringing the polished surfaces into juxtaposed relation with a film of a separating and protecting composition therebetween, welding a backing of another material about said slabs by rolling, and then separating the polished surfaces.

11. In the manufacture of a composite metallic article by casting and rolling having a polished surface thereon without polishing treatment subsequent to rolling, the method which comprises polishing a surface of a pair of metal slabs, bringing the polished surfaces into juxtaposed relation with a film of a separating and protecting composition therebetween, casting a backing of another material about said slabs, rolling the ingot thus formed, and then separating the polished surfaces.

12. In the manufacture of a composite metallic article by welding and rolling having a polished surface thereon without polishing treatment subsequent to rolling, the method which comprises polishing a surface of a plurality of metal slabs, assembling said slabs to form a core with the polished surfaces in juxtaposed relation and with a film of a separating and protecting composition between the polished surfaces, sealing the edges of said slabs to form vapor-tight envelopes for the separating composition, casting another metal about said core, rolling the ingot thus formed, and then separating the polished surfaces.

13. In the manufacture of a composite metal article by casting a metal about a core of juxtaposed metal slabs, the steps comprising placing metal slabs in juxtaposed relation with a separating composition therebetween, and then uniting the edges of said slabs to form a protective envelope for said separating composition to thereby protect said separating composition during the casting step.

14. The method of forming a composite article which comprises positioning metal slabs in juxtaposed relation with a separating composition therebetween, sealing the edges of said slabs to form an envelope for the composition, and then casting metal about said slabs.

15. The method of forming a composite article which comprises positioning metal slabs in juxtaposed relation with a separating composition therebetween, welding the edges of said slabs to form an envelope for the separating composition, casting metal about said slabs, and then rolling the ingot so formed.

16. The method of forming a composite metal article, which comprises forming a core of slabs of a rustless ferrous composition in juxtaposed relation with a separating composition therebetween, sealing the edges of said slabs to form a vapor-tight envelope for said separating composition, and then casting a metal about the core.

17. The method of forming a composite metal article, which comprises forming a core of juxtaposed stainless steel slabs with a separating composition therebetween, sealing the edges of said slabs to form a vapor-tight envelope for said separating composition, casting a metal about said core adapted to unite with said slabs, and then rolling the ingot so formed.

18. The method of forming a composite metallic article, which comprises forming a core of two juxtaposed slabs of a non-rusting alloy with a separating composition therebetween, welding the edges of said slabs to form an envelope for the composition, and casting metal about the core.

19. The method of forming a composite metallic article, which comprises forming a core of two juxtaposed rustless iron slabs with a separating composition therebetween, welding the edges of said slabs to form an envelope for said separating composition, casting a mild steel about said slabs, and then rolling the ingot thus formed to complete the weld between said mild steel and said slabs and to reduce the thickness of the composite article to sheet form.

20. The method of forming a composite metallic article, which comprises forming a core of two juxtaposed metal slabs with a separating medium therebetween, uniting said slabs about the edges of their common surfaces to form an envelope for said separating medium, casting a metal about said slabs, reheating the ingot thus formed to forging temperature, and then rolling the ingot.

21. The method of forming a composite metallic article, which comprises forming a core of two juxtaposed slabs of chromium steel alloy with a separating composition therebetween, welding the edges surrounding their common surfaces to form an envelope for said composition, casting a metal about said slabs, reheating the ingot thus formed to forging temperature, and then rolling the ingot.

In testimony whereof I have hereunto subscribed my name at Chicago, Cook County, Illinois.

STEPHEN L. INGERSOLL.